(12) United States Patent
Dice et al.

(10) Patent No.: US 8,789,057 B2
(45) Date of Patent: Jul. 22, 2014

(54) SYSTEM AND METHOD FOR REDUCING SERIALIZATION IN TRANSACTIONAL MEMORY USING GANG RELEASE OF BLOCKED THREADS

(75) Inventors: David Dice, Foxboro, MA (US); Mark S. Moir, Windham, NH (US)

(73) Assignee: Oracle America, Inc., Redwood City, CA (US)

( * ) Notice: Subject to any disclaimer, the term of this patent is extended or adjusted under 35 U.S.C. 154(b) by 1372 days.

(21) Appl. No.: 12/327,659

(22) Filed: Dec. 3, 2008

(65) Prior Publication Data

US 2010/0138836 A1 Jun. 3, 2010

(51) Int. Cl.
*G06F 9/46* (2006.01)
*G06F 9/48* (2006.01)
*G06F 9/52* (2006.01)

(52) U.S. Cl.
CPC ............ *G06F 9/466* (2013.01); *G06F 9/4881* (2013.01); *G06F 9/4843* (2013.01); *G06F 9/52* (2013.01)
USPC ........... 718/101; 718/102; 718/104; 718/107; 711/150; 711/152

(58) Field of Classification Search
CPC ..... G06F 9/466; G06F 9/4881; G06F 9/4843; G06F 9/52
USPC ........... 718/102, 104, 107, 101; 711/150, 152
See application file for complete search history.

(56) References Cited

U.S. PATENT DOCUMENTS

| | | | |
|---|---|---|---|
| 5,428,761 A | 6/1995 | Herlihy et al. | |
| 5,983,225 A * | 11/1999 | Anfindsen | 1/1 |
| 6,735,760 B1 | 5/2004 | Dice | |
| 7,120,762 B2 * | 10/2006 | Rajwar et al. | 711/150 |
| 7,496,716 B2 * | 2/2009 | Dice et al. | 711/147 |
| 7,500,242 B2 * | 3/2009 | Shah et al. | 718/104 |
| 7,765,364 B2 * | 7/2010 | Rajwar et al. | 711/150 |
| 7,792,805 B2 * | 9/2010 | Shavit et al. | 707/704 |
| 7,856,537 B2 * | 12/2010 | Kumar et al. | 711/152 |
| 8,060,879 B2 * | 11/2011 | Shavit et al. | 718/102 |
| 8,099,538 B2 * | 1/2012 | Saha et al. | 710/200 |
| 2007/0143755 A1 * | 6/2007 | Sahu et al. | 718/100 |

(Continued)

OTHER PUBLICATIONS

David Dice, et al., "Applications of the Adaptive Transactional Memory Test Platform," 2008, 10 pages.

(Continued)

*Primary Examiner* — Aimee Li
(74) *Attorney, Agent, or Firm* — Robert C. Kowert; Meyertons, Hood, Kivlin, Kowert & Goetzel, P.C.

(57) ABSTRACT

Transactional Lock Elision (TLE) may allow multiple threads to concurrently execute critical sections as speculative transactions. Transactions may abort due to various reasons. To avoid starvation, transactions may revert to execution using mutual exclusion when transactional execution fails. Because threads may revert to mutual exclusion in response to the mutual exclusion of other threads, a positive feedback loop may form in times of high congestion, causing a "lemming effect". To regain the benefits of concurrent transactional execution, the system may allow one or more threads awaiting a given lock to be released from the wait queue and instead attempt transactional execution. A gang release may allow a subset of waiting threads to be released simultaneously. The subset may be chosen dependent on the number of waiting threads, historical abort relationships between threads, analysis of transactions of each thread, sensitivity of each thread to abort, and/or other thread-local or global criteria.

20 Claims, 4 Drawing Sheets

(56) References Cited

U.S. PATENT DOCUMENTS

| | | | |
|---|---|---|---|
| 2007/0239915 A1* | 10/2007 | Saha et al. | 710/200 |
| 2008/0040551 A1* | 2/2008 | Gray et al. | 711/130 |
| 2009/0198694 A1* | 8/2009 | Thomas | 707/8 |
| 2010/0138841 A1* | 6/2010 | Dice et al. | 718/107 |

OTHER PUBLICATIONS

Michael A. Bender, et al., Adversarial Contention Resolution for Simple Channels, SPAA 2005, ACM, 8 pages.

M. L Scott and W. N. Scherer III, "Scalable Queue-Based Spin Locks with Timeout," 8th ACM PPoPP, 2001.

Herlihy, et al., "Transactional Memory: Architectural Support for Lock-Free Data Structures," Proc. 20th Annual International Symposium on Computer Architecture, pp. 289-300, May 1993.

Scherer, III, et al., "Advanced Contention Management for Dynamic Software Transactional Memory," Proc. of the 24th Annual ACM Symposium on Principles of Distributed Computing, 2005, pp. 240-248.

Guerraoui, et al., "Robust Contention Management in Software Transactional Memory," Proc. of the OOPSLA 2005 Workshop on Synchronization and Concurrency in Object-Oriented Languages, 2005.

Ansari, et al., "Adaptive Concurrency Control for Transactional Memory," 2008, 12 pages.

Attiya, et al., "Transactional contention management as a non-clairvoyant scheduling problem", ACM, 2006, pp. 308-315.

Rajwar, et al., "Speculative Lock Elision: Enabling Highly Concurrent Multithreaded Execution," Appears in the Proceedings of the 34th International Symposium on Microarchitecture (MICRO), Dec. 3-5, 2001, Austin, TX, 12 pages.

Rajwar, et al., "Transactional Lock-Free Execution of Lock-Based Programs," Appears in the Proc. of the 10th International Conf. on Architectural Support for Programming Languages and Operating Systems (ASPLOS), Oct 6-9, 2002, San Jose, CA, 13 pages.

Martinez, et al., "Speculative Synchronization: Applying Thread-Level Speculation to Explicitly Parallel Applications," ASPLOS X 10/102, San Jose, CA, 2002 ACM ISBN 1-58113-574-2/02/0010 . . . , 12 pages.

Hammond, et al., "Transactional Memory Coherence and Consistency," ISCA-31, 2004, 12 pages.

Posva, et al., "Speculative Locking—Breaking the Scale Barrier," JavaOne, Sun's 2005 Worldwide Java Developer Conference, 37 pages.

Dave Dice, "Implementing Fast Java Monitors with Relaxed-Locks," USENIX JVM'01, 13 pages.

Adam Welc, et al, "Transactional Monitors for Concurrent Objects," ECOOP'04, 24 pages.

Adam Welc, et al, "Transparently Reconciling Transactions with Locking for Java Synchronization," ECOOP'04, 26 pages.

Dice, et al., "Transactional Locking II," DISC 2006, 15 pages.

Wikipedia, "Carrier sense multiple access with collision detection," last updated Feb. 12, 2009, http://en.wikipedia.org/wiki/Carrier_sense_multiple_access_with_collision_detection, 2 pages.

Wikipedia, "Admission Control," last updated Dec. 14, 2008, http://en.wikipedia.org/wiki/Admission_control, 1 page.

Wikipedia, "Carrier sense multiple access with collision avoidance," last updated Feb. 14, 2009, http://en.wikipedia.org/wiki/Carrier_sense_multiple_access_with_collision_avoidance, 14 pages.

Keir Fraser, "Practical Lock-Freedom," Ph. D. Dissertation—King's College, Univerity of Cambridge, 2003. (Final version, Feb. 2004), 116 pages.

U.S. Appl. No. 12/325,870, filed Dec. 1, 2008.

U.S. Appl. No. 11/967,371, filed Dec. 31, 2007.

J. Mellor-Crummey and M. Scott, "Algorithms for scalable synchronization on shared-memory multiprocessors," ACM Transactions on Computer Systems, 9(1), 1991.

U.S. Appl. No. 12/324,109, filed Nov. 26, 2008.

Wikipedia, "Truncated binary exponential backoff," last updated Apr. 13, 2008, http://en.wikipedia.org/wiki/Truncated_binary_exponential_backoff, 1 page.

Lev, "PhTM: Phased Transactional Memory," Transact 2007, 11 pages.

Pang, et al., "Performance Evaluation of an Adaptive Backoff scheme for WLAN,"Wireless Communications and Mobile Computing, 2004, 13 pages.

Yoo, et al., "Adaptive Transaction Scheduling for Transactional Memory Systems," Georgia Institute of Technology, CERCS;GIT-CERCS-07-04.

O. Agesen, et al., "An efficient meta-lock for implementing ubiquitous synchronization," ACM SIGPLAN International Conference on Object-Oriented Programming Systems, Languages and Applications (OOPSLA), 1999, 30 pages.

\* cited by examiner

SYSTEM AND METHOD FOR REDUCING SERIALIZATION IN TRANSACTIONAL MEMORY USING GANG RELEASE OF BLOCKED THREADS

BACKGROUND OF THE INVENTION

1. Field of the Invention

This invention relates generally to multithreaded computer systems and, more specifically, to a system and method for improving the operation of transactional memory systems.

2. Description of the Related Art

Due to the complexity and energy concerns of modern processors, traditional approaches to boosting CPU performance have become difficult and ineffective. Instead of attempting to drive up clock speeds, computer architects are increasingly turning to multi-threading techniques such as symmetric multi-threading or multi-core architectures. In order to leverage these new architectures, software engineers must write applications that execute using multiple concurrent threads of execution. Unfortunately, correct multi-threaded programming is notoriously difficult using traditional language constructs.

Shared-memory systems allow multiple threads to access and operate on the same memory locations. Traditional constructs, such as mutual exclusion and locks may be used by a thread to ensure correctness by allowing the thread to exclude all other threads from accessing a given shared memory location or shared function while the thread is executing a critical section of code. While a lock is being held, all other threads wishing to execute a critical section dependant on that lock must await the lock's release and acquire it before proceeding. While various attempts to execute a given critical section may depend on the acquisition of multiple locks and/or dynamically determined locks (e.g., locks dependent on instance-specific shared data), the term critical section, as used herein, may generally refer to a code path or a set of program instructions protected by a given lock.

The pitfalls of locking constructs are numerous and well known. They include dead-lock, race conditions, priority inversions, software complexity, and performance limitations. Locking is a heavy-handed approach to concurrency control.

Alternatively, it may be possible to increase parallelism by allowing multiple threads to concurrently execute critical sections that depend on common locks. This may increase performance and mitigate or eliminate many of the pitfalls normally associated with traditional locking mechanisms. However, such interleaved executions are not guaranteed to be correct.

Transactional memory is a mechanism that can be leveraged to enable multiple threads to execute critical sections dependant on the same lock, concurrently and correctly. Transactional memory allows a thread to execute a series of instructions as a transaction, that is, either completely and atomically or not at all. The instructions comprising a transaction are executed and then either "committed", allowing the aggregate effect to be seen by all other threads, or "aborted", allowing no effect to be seen. A transaction that has committed successfully may be said to have "succeeded". Transactional lock-elision (TLE) is a technique that allows threads to execute critical sections dependant on the same lock or locks concurrently and transactionally without necessarily acquiring the corresponding lock. It provides identical semantics to traditional mutual exclusion but allows threads to execute critical sections as transactions that can be aborted if conflicts occur. Under TLE, instead of acquiring a lock, a thread may attempt to execute the critical section as a transaction, and simply abort if a conflict occurs with another thread before the transaction can be committed. This may be referred to as "transactionally eliding" a lock. The lock elision is successful if the thread successfully executes and commits a critical section dependant on that lock. Aborted transactions may be retried by the thread later.

In some TLE implementations, in response to repeated aborts, insufficient system resources, or other conditions, threads may revert to executing critical sections using mutual exclusion (e.g., by acquiring and/or holding one or more locks) rather than in a transactional mode (e.g., transactionally eliding such locks). If a thread acquires a lock, then no other threads may concurrently elide that lock. Therefore, mutually excluding threads may cause other threads to also execute using mutual exclusion rather than transactionally. As more threads revert to mutual exclusion, the likelihood grows that still more threads dependent on the same lock(s) will likewise revert to mutual exclusion rather than executing in a transactional mode. The net effect is that transactional mode execution of some critical sections may cease altogether until contention abates. This phenomenon may be detrimental to system performance and is referred to herein as the lemming effect.

SUMMARY

In some TLE implementations, a positive feedback loop whereby mutually excluding threads cause other threads to execute using mutual exclusion, may occur in times of high contention for given locks and/or lock sites. This phenomenon may be referred to as "the lemming effect". In some embodiments, the lemming effect may be mitigated by application of a technique to determine a subset, or "gang," of threads that are blocked from executing while awaiting a given lock and to allow all the threads of that gang to elide the lock transactionally. This operation may be referred to as a "gang release."

In various embodiments, the gang may include all of the threads waiting on the lock or a proper subset of those threads. The members of the gang may be determined dependent on one or more of: the number of threads awaiting the lock, historical abort relationships between two or more of the waiting threads, the program instruction mix of the critical section that each thread is attempting to execute, or other factors.

As threads in the gang finish execution of their respective transactions (i.e. as they either commit successfully or revert to mutual exclusion and return to the pool of waiting threads), the system may wake or release additional threads awaiting the lock into the existing gang. This may allow the newly released threads to transactionally elide the lock and to execute transactionally and concurrently with the other threads in the gang. In some cases, newly released threads may have been released in previous release iterations. As with the initial gang formation, subsequent release decisions may be based on any of the factors listed above for determining the original gang. For example, a thread that was omitted from an initially created gang because it was deemed likely (e.g., based on a historical abort relationship) to interfere with another member of the gang may be released once the other member successfully commits. In another example, a gang may have a predetermined maximum number of members and new threads may be added as others leave the gang, either by succeeding or by being returned to the waiting pool. The maximum number of gang members may in various embodiments be fixed (e.g., predetermined), or may be determined dynamically as a function of the number of waiting threads, or as a function of any other execution data.

Figure 1:
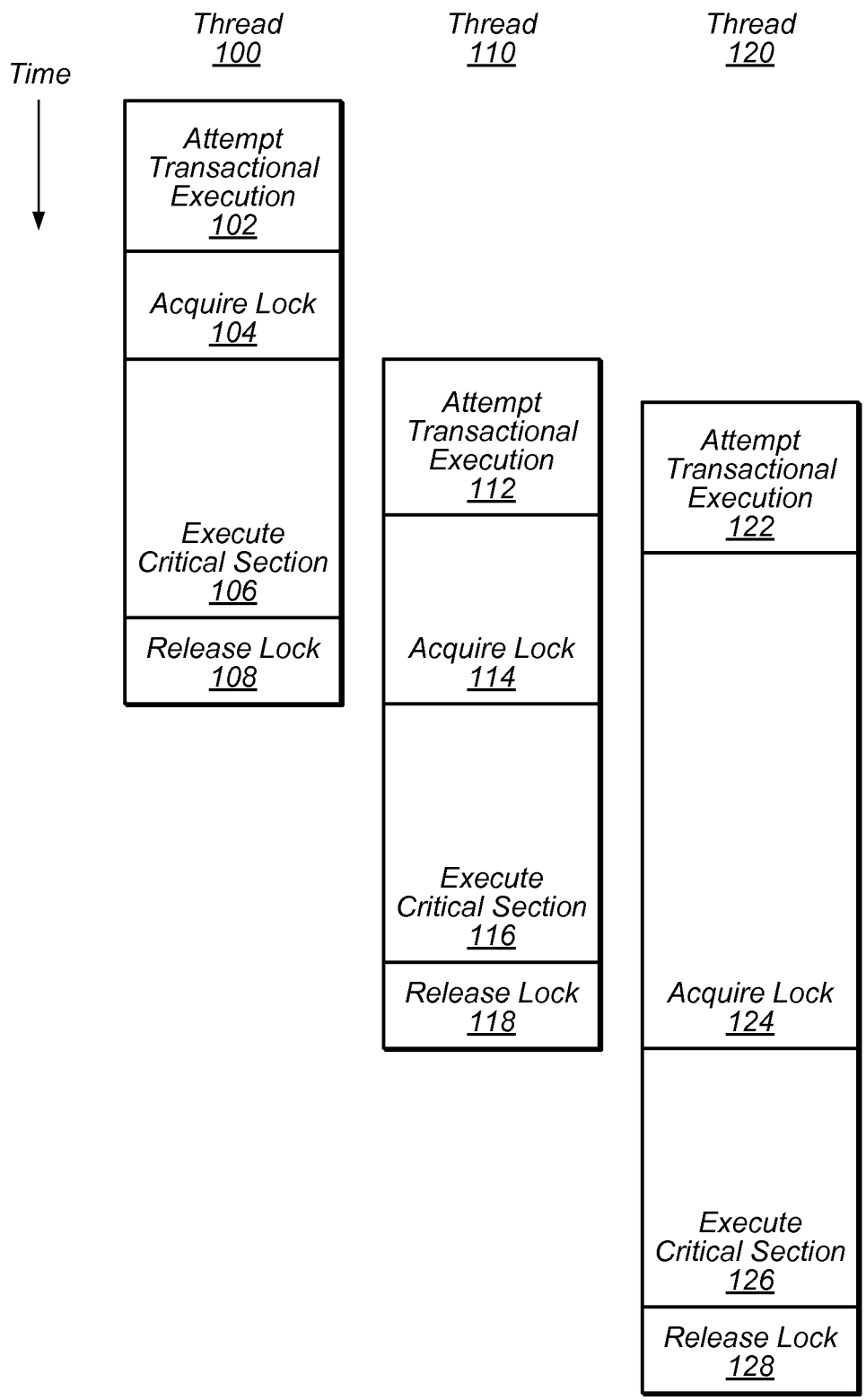
FIG. 1 is a time sequence diagram illustrating the lemming effect arising from the execution of three concurrent threads.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF THE EMBODIMENTS

In some embodiments of a system implementing TLE, a thread may execute a critical section using mutual exclusion or in transactional mode. There may be various reasons why a thread in a transactional memory system may attempt to execute a critical section using mutual exclusion (i.e. revert to mutual exclusion) rather than attempting to execute it transactionally. In some cases, it may be infeasible to execute a given critical section transactionally. For example, a critical section may be too long to execute transactionally because it may require more transactional resources than are available on the hardware. In another example, it may be infeasible to execute a critical section transactionally because it contains one or more instructions that cannot be executed transactionally. If the effects of such an instruction may be observed by entities other than the executing thread before the transaction is committed, then the critical section cannot be executed transactionally. For example, an I/O instruction, such as a print to screen or write to the file system, may be immediately observed upon execution, and its effects cannot be completely "undone". Therefore, a transactional memory implementation may forbid the transactional execution of critical sections containing such instructions, and may instead execute them using mutual exclusion.

In some embodiments, a system implementing TLE may revert to executing a given critical section using mutual exclusion due to high contention. For example, if the execution is repeatedly attempted in transactional mode and aborted due to contention from other threads, it may be more productive to execute the critical section using mutual exclusion than to continue attempting to execute it transactionally. Some transactional memory systems may permit mutual abort with no progress, that is, a thread may cause one or more other threads to abort, even if it aborts itself. In such systems, mutual aborts may increase the rate at which threads revert to mutual exclusive execution.

Another reason for executing a critical section using mutual exclusion rather than transactionally may be a sustained inability to execute the critical section transactionally due to mutual exclusion by other threads. A transaction may not commit instructions inside of a critical section while a lock for that section is being held by another thread. In the presence of other mutually excluding threads, a thread that never reverts to mutual exclusion may risk starvation. For example, a given thread T1 may hold a lock over a critical section, while another thread T2 concurrently attempts to execute the same section. However, the lock semantics imply that while T1 holds the lock, no other thread may successfully elide the lock. To guarantee progress, T2 may eventually revert to mutual exclusion itself, thereby causing an increase in the number of threads attempting to execute using mutual exclusion. In other words, if the system's response to excessive mutual exclusion is to create yet more mutual exclusion, this may result in formation of a positive feedback loop that is the basis for the lemming effect.

FIG. 1 illustrates an example of the lemming effect and its possible impact on system performance. In this example, thread 100 makes an attempt to execute a critical section transactionally, as in 102. The attempt fails for one of the reasons stated above (e.g., the transaction is too long, or it includes a system call trap to invoke an I/O operation). This results in an abort of the transaction and, since reattempting the abort would be futile, thread 100 reverts to mutual exclusion. Thread 100 acquires an appropriate lock, as in 104, and begins to execute the critical section, as in 106. In the illustration, while thread 100 executes, two more threads, 110 and 120, each arrive at a critical section protected by the same lock. Both attempt transactional execution, as in 112 and 122, but abort because thread 100 holds the lock. Threads 110 and 120 may spin, waiting for the lock to be released by thread 100. In this example, each thread may eventually revert to mutual exclusion as described above.

In the example illustrated in FIG. 1, threads 110 and 120 both attempt to acquire the lock (as in 114 and 124), but cannot because it is being held by thread 100. In some embodiments, threads 110 and 120 may be entered into a queue of threads awaiting the lock. In the example illustrated in FIG. 1, when thread 100 finishes executing the critical section and releases the lock, as in 108, thread 110 acquires it and proceeds to execute the critical section using mutual exclusion, as in 116. Thread 120 continues to wait on the lock, as in 124. When thread 110 releases the lock, as in 118, thread 120 may then continue with execution of the critical section using mutual exclusion, as in 126. Finally, following execution of the critical section, thread 120 may release the lock, as in 128.

In one example, thread 100 may have invoked a resize( ) operation on a Java™ hash table, either directly or indirectly via a put( ) operation. Resize( ), which tends to be a relatively rare operation, may be long and infeasible to execute transactionally. Threads calling resize( ) may therefore be more likely to revert to mutual exclusion and acquire a lock on the entire hash table structure. Threads 110 and 120 may invoke get( ) or non-structural put( ) operations on the same hash table. These get( ) and put( ) operations may include small critical sections that may be more likely to be transactionally feasible than a resize( ) operation. Furthermore, depending on the application, concurrent get( ) and put( ) operations invoked by different threads may be unlikely to access the same data, making them well suited for transactional execution. However, despite the likelihood that threads 110 and 120 may successfully execute concurrently using transactions, the resize( ) operation of thread 100 may induce a persistent lemming effect and force concurrent or subsequently arriving put( ) and get( ) operations, such as those invoked by threads 100 and 110, to be executed serially, using mutual exclusion.

The net effect of the sequence illustrated in FIG. 1 is that threads 100, 110, and 120 are executed serially, and the system is denied the benefits of TLE. In this example, it is possible that threads 110 and 120 may have been able to be successfully executed concurrently using TLE, but due to the mutual exclusion of thread 100, the concurrent execution of threads 110 and 120 was never attempted. Had more threads arrived at critical sections protected by the same lock, this problem may have been compounded. In general, it may be possible that high contention may lead to episodic serialization, which may deny TLE benefits to the system.

To mitigate these effects, in some embodiments the system may be configured to allow any subset, or "gang", of threads waiting on a lock to reattempt transactional mode execution rather than mutual exclusion. This technique is broadly referred to herein as "gang release". In such embodiments the system may include runtime infrastructure support to implement modified locking semantics for gang release as detailed herein.

Figure 2:
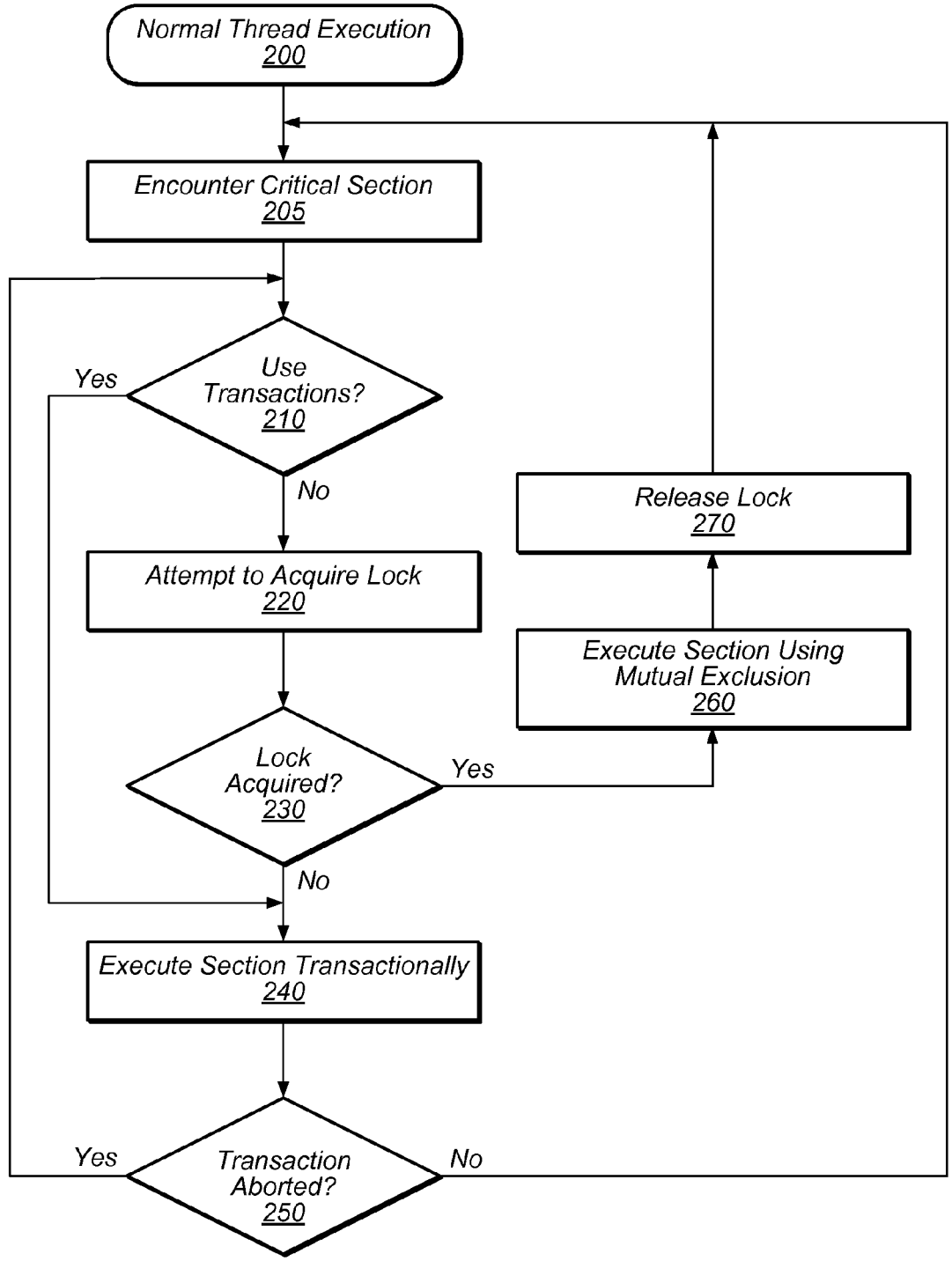
FIG. 2 a flow diagram illustrating a method for executing a critical section using a thread, according to various embodiments.

FIG. 2 illustrates a method for executing a thread, according to various embodiments. The method begins with a start state of normal thread execution, as in 200. The thread may eventually encounter a critical section, as in 205. A decision may be made, as in 210, about whether to execute the critical section transactionally. In various embodiments, this decision may be made by the thread, by a contention manager, by other components of the system, or by any combination of these system elements. If a decision to execute transactionally is made, as indicated by the affirmative exit from 210, then the thread may attempt to execute the critical section transactionally, as in 240. If the transaction succeeds, then the thread has successfully executed the critical section and may continue normal execution, as noted by the negative exit from 250 and the feedback to 205. Otherwise, if the transaction aborts, as indicated by the affirmative exit from 250, then the thread may return to the TLE decision point at 210.

However, if a decision is made to execute the critical section using mutual exclusion (shown as the negative exit from 210), then the thread may attempt to acquire the necessary lock, as in 220. In traditional locking, a thread may obtain a lock on an object O1, by using a synchronous runtime infrastructure support routine (e.g., lock(O1)) which returns control to the thread only when the lock controlling O1 is acquired. In such systems, the thread must wait until the locking function returns, execute the critical section using mutual exclusion as in 260, and then release the lock as in 270. In some embodiments, threads may de-schedule (i.e., block) themselves to allow other threads to have access to the processor, or may spin waiting for the lock.

Note that in other embodiments, different locking semantics may be employed that those described above. For example, in some embodiments, the system may include a runtime support routine TLELock( ), which may offer similar semantics to the traditional lock( ), but may return with results other than just affirmation that the lock has been acquired. More specifically, the TLELock( ) routine may return one or more values indicating that the calling thread has not been granted the lock, but instead, may reattempt transactionally. For example, in some embodiments, TLELock may implement the interface "boolean TLELock(obj)". In this example, obj may be the object, or reference to the object, whose lock the caller wishes to acquire. The function may return a Boolean value indicating whether the lock has been acquired. If the lock has been acquired, the thread may proceed to execute the transaction using mutual exclusion, as shown by the affirmative exit from 230 in FIG. 2. In this example, the thread may interpret a false value as indicating that the lock has not been acquired and that execution may be attempted again transactionally, as in 240. This option is indicated by the negative exit from 230.

In various embodiments, the system may revert the execution of critical sections to mutual exclusion using other methods. For example, in some embodiments, multiple values may be returned from TLELock( ). This may be done by returning a data structure, or pointer to a data structure, instead of, or in addition to, a Boolean value. Alternatively, TLELock( ) may return one or more values by augmenting values of arguments passed to it. In some embodiments, TLELock( ) may be an asynchronous function that may communicate whether or not the lock has been acquired, along with other pertinent information, via shared variables. These variables may be written to globally available memory and/or file systems, and/or may be passed to the TLELock( ) as arguments. In each of these examples, the system may provide locking semantics that may prompt a thread that had previously abandoned TLE in favor of mutual exclusion to reattempt transactional execution of a critical section.

As shown in 270, once a thread has finished executing a critical section using mutual exclusion, it may release the corresponding lock. This may be done using a suitable system runtime support function (e.g., unlock( )). The unlock function may check to see if any threads are waiting for the lock. If so, then the function may assign the lock to the thread at the top of the lock's wait queue. In some embodiments, the system may be configured to respond to an unlock request by permitting and/or signaling one or more threads in the lock queue to attempt execution using TLE.

Figure 3:
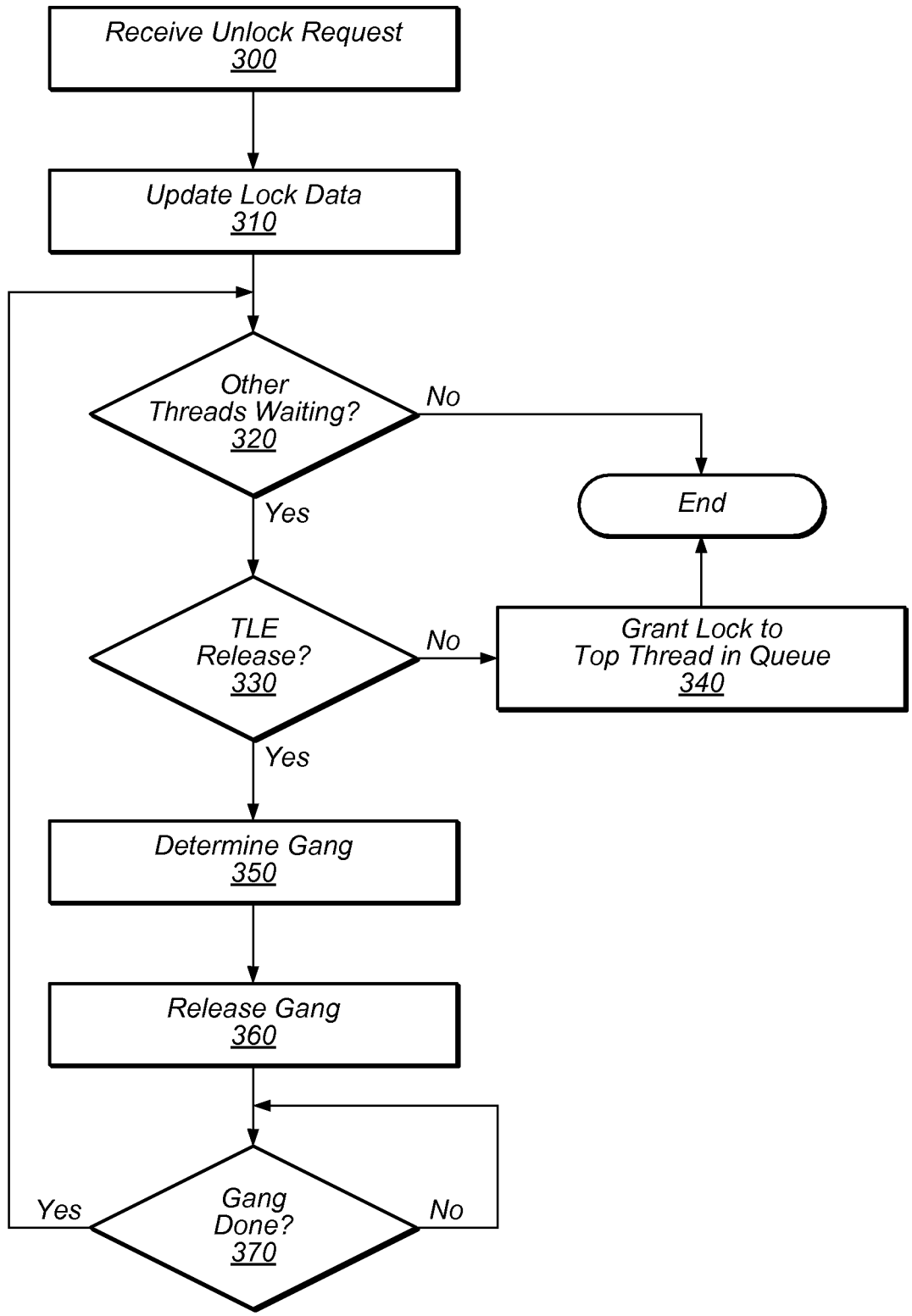
FIG. 3 is a flow diagram illustrating a method for managing the execution of one or more threads waiting on a lock, according to various embodiments.

FIG. 3 illustrates a method for performing an unlock operation, according to various embodiments. The method illustrated in FIG. 3 may, in various embodiments, be implemented by system support routines or other modules, including one or more contention managers. The illustrated method is initiated when the system receives an unlock request as in 300. This may occur, for example, when an unlock( ) runtime support function is called. In alternative embodiments, the method may be initiated by a state change of one or more shared memory locations and/or in response to the runtime system receiving an indication that the current lock holder no longer requires the lock.

After receiving an indication that the lock has been, or is to be, released, in various embodiments, the system may modify any number of variables and data structures, including lock metadata, internal-bookkeeping structures, or other structures as necessitated by the lock release protocol. The system may also invoke various other system calls in response to the release notification or request. These release mechanics are represented in FIG. 3 by element 310.

The system may then, as in 320, determine if other threads are waiting for the lock. In various embodiments, the identity of waiting threads may be stored in a queue (e.g., first-in-first-out (FIFO), last-in-first-out (LIFO), priority queue, etc) or any other data structure. If no threads are waiting on the lock, then the method ends, as indicated by the negative exit from 320. However, if one or more threads are waiting on the lock, then the system may determine how they are to be executed, as in 330. One possibility is that the threads in the queue continue to use mutual exclusion. In this case, the system may allow a single thread to acquire the lock and proceed, as in 340. The system may grant the lock to a thread chosen by any policy (e.g., according to a FIFO queue or a priority queue, or randomly). In alternate embodiments, the system may not take direct responsibility for choosing a lock successor, but may delegate it to some other component. In some embodiments, the system may intentionally allow a race between the threads to determine the subsequent lock holder, which may be referred to as "competitive succession".

Another option is to release one or more of the waiting threads for transactional execution, as indicated by the affirmative exit from 330. The decision to release threads may be based on policy or on various thread-local or global execution data. For example, the system may base the decision on the number of threads waiting on the lock. In some embodiments, the abort causation relationships between the threads may be considered. In some embodiments, analysis of the critical section that each thread is attempting to execute may be considered. For example, if the threads are waiting on a priority queue, and the next thread is attempting to execute a long transaction, then a system may decide to proceed with mutual exclusion rather than accept the relatively higher risk of abort. In this example, the resulting serialization may be preferable to concurrent execution of the thread with others resulting in mutual aborts. In some embodiments, the amount of time or other resources likely to be consumed by the abort of any given thread may also be considered in making a decision about whether to execute waiting threads using transactions or mutual exclusion. In general, any combination of such thread-local and/or global execution data may be considered in making this decision.

A gang release policy may, in some embodiments, employ adaptive feedback, allowing past behavior to drive future release decisions. If gang release has been profitable for a given thread, logical lock-site, physical lock-site, lock instance, or lock type, then the system may prefer gang release under the same circumstances and context in the future. Similarly, if gang release has not been profitable for a given set of circumstances, the system may disable it or attempt it less frequently in the future under similar conditions. In some embodiments, the utility of gang release may be measured using the ratio of recently released threads that did not need to revert to mutual exclusion again. In various embodiments, the system may leverage other inputs for adaptive feedback, including those based on any combination of the thread-local and/or global data described above.

Given aggressive in-lining by a compiler, a single logical lock site may correspond to multiple emitted lock sites. Those emitted lock sites may in some embodiments correspond statically to a known call stack suffix. This may allow further adaptive refinement and tuning by physical lock site. Specifically, the address of the physical lock site may in some embodiments be passed into TLELock( ). This information may be recorded in the locking system and may enable the locking system to use that information when making decisions related to gang release. Extending the hash table example described above, it may be likely that a gang release of threads trying to enter the critical sections for get( ) and put( ) operations would be profitable, whereas release of threads blocked at a resize( ) operation would not.

In some embodiments, various other arguments may be passed into TLELock( ) or other support functions to assist with release decisions. For example, in some embodiments, TLELock( ) may accept one or more arguments indicating whether the transaction has failed during a previous execution attempt. Another argument may indicate the reason for that failure. In various embodiments that include hardware support for transactional memory, TLELock( ) may utilize values in one or more status registers. For example, one or more registers may be configured to store data reflecting current and/or historical abort relationships between various threads. Such arguments may help determine the expected fruitfulness of retrying transactional execution. For example, if a given thread's previous transactional attempt aborted because of an infeasible transaction (e.g., the transaction contained an I/O operation), then it may be more likely that a subsequent transactional attempt at TLE will fail again in the same manner. In such cases, gang release of the given thread may not be useful. However, it may not be guaranteed that reattempting the critical section transactionally will again result in an abort. For example, changes to global, shared, data structures by other threads since the time of the first aborted TLE attempt may alter the path taken and/or the data accessed by later attempts, possibly rendering them feasible for transactional execution.

In the example illustrated in FIG. 3, if the determination is made to release one or more threads to transactional execution, as indicated by the affirmative exit from 330, then the system may decide what subset of the threads to release. As previously noted, a released subset is referred to herein as a gang. In some embodiments, determining the gang to be released may be policy based. For example, a gang release decision may always release all waiting threads. Alternatively, a predetermined fraction of the threads may always be released. In some embodiments, the policy may be to release all the threads, up to some maximum number of threads. For example, the policy may be to release a number of threads less than or equal to the number of logical processors in the system.

In various embodiments, the system may determine the gang dynamically using any type of execution data. This may include any of the data or mechanisms described above used in making the gang release decision, as in 330. Dynamic gang determination may be desirable because some subsets may more suitable for executing concurrently over a lock than others. For example, in some embodiments, information regarding historical abort relationships may be used to determine a gang whose members are less likely to interfere with one another. In another example, threads intending to execute short transactions may be less likely to cause mutual aborts than those needing to execute long transactions. In general, any thread-local or global data may be used in making dynamic gang formulation decisions.

Note that in some embodiments, gang release may serve a role in contention management. For example, in some embodiments, gang release may be used to artificially restrict concurrency over a given lock to a level that provides near optimal throughput. In such embodiments, some subset of threads may be transiently and briefly taken out of circulation and held on queues associated with the lock in order to reduce concurrency.

In the example illustrated in FIG. 3, once a gang is determined, as in 350, the gang may be released to execute transactionally as in 360. Members of the gang may be released in any order or simultaneously, in different embodiments. In some embodiments, the order of release may be based on the execution data outlined above.

Once a gang is released to transactional execution, the system may employ many different policies for allowing the gang to execute. If a proper subset of threads were released, then there may be other threads waiting for the lock. In such a case, granting the lock to a waiting thread may be undesirable, since it may cause the immediate abort of every gang member. In some embodiments, such as that pictured in FIG.

3, the system may wait for each member of the gang to either fail or succeed in its attempt to execute transactionally before allowing one or more other waiting threads to acquire the lock or to proceed transactionally. The system may simply wait, as in the negative exit from 370, until all threads in the gang have completed their attempts to execute transactionally. In such embodiments, a thread in the gang may complete its attempt by either successfully committing its transaction or by reverting to mutual exclusion again and returning to the waiting pool. Once all the threads in the gang have completed their attempts to execute transactionally, as in the affirmative exit from 370, the method may include a return to decision block 320.

In other embodiments, one or more waiting threads may be permitted to proceed transactionally as members of the gang complete their attempts to execute transactionally (either successfully or unsuccessfully). The system may wait for a given number of threads in the gang to finish before releasing other threads. Alternatively, additional threads may be released only when certain other threads in the gang finish. In various embodiments, any number of factors may be used to determine which additional threads, if any, are released to join the gang and when such releases should occur. For example, in one embodiment, a system may release an arbitrary gang quickly and subsequently release additional threads to the gang based on a more detailed and/or time consuming analysis. In other embodiments, the system may only wait for a certain number of threads in the gang to finish their transactional execution attempts before granting the lock to a waiting thread. Another policy may include granting the lock to any gang member that fails to execute transactionally and subsequently requests the lock. In other embodiments, the lock may be granted to a thread outside of the gang, and/or aborted gang members may join any waiting threads in the queue and be subject to arbitrary selection policies.

In various embodiments, gang execution policy decisions may be made dynamically and may be informed by any amount and type of data. For example, if a high priority thread arrives at the locking site before all the members of a gang have finished executing, the system may grant it the lock even if doing so may cause one or more members of the gang to abort. Alternatively, if a high priority thread is a member in a gang and aborts, the system may grant the high priority thread an exclusive lock immediately, without waiting for the rest of the gang to finish their execution attempts. Gang members, threads excluded from the gang, and/or newly arrived threads may all be considered for execution according to various policies, which may consider any number of execution data, priority data, or other statically available data.

Note that while pessimistic concurrency control is often implemented by way of locks, other mechanisms may be employed, such as disabling interrupts or task switching on uniprocessor systems, or causing potentially conflicting threads to be ineligible for scheduling while one thread executes a critical section.

Nested or recursive locking may, in some embodiments, be implemented by "flattening" inner transactions, effectively subsuming them within an outer transaction. This may be accomplished at run-time by maintaining a transactional depth counter for each thread, which may be incremented at the start of a critical section's execution attempt and decremented upon its completion.

Figure 4:
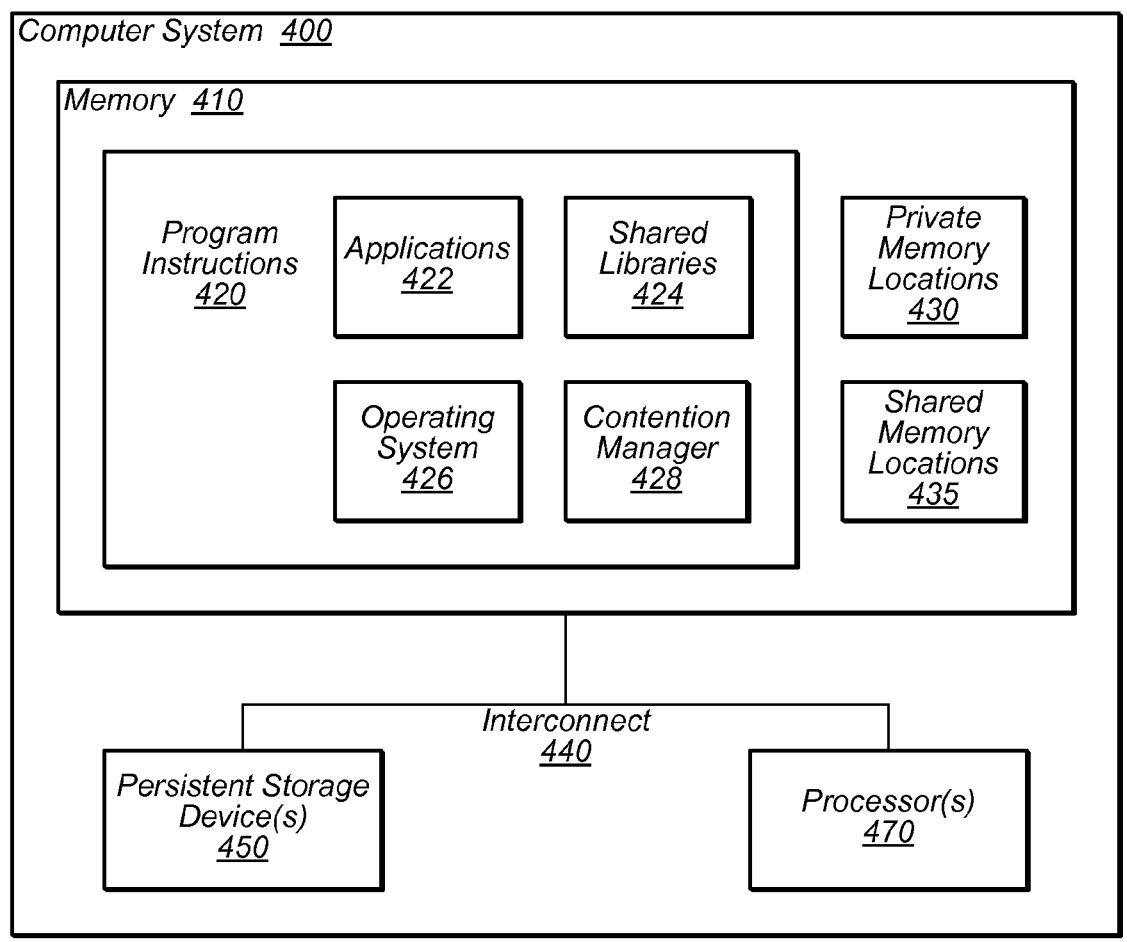
FIG. 4 is a schematic diagram illustrating a computer system configured to implement the system and methods described herein, according to one embodiment.

FIG. 4 illustrates a computing system configured to implement the methods described herein, according to various embodiments. The computer system 400 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The contention management mechanisms described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 400 may include one or more processors 470, each may include multiple cores, any of which may be single or multi-threaded. The computer system 400 may also include one or more persistent storage devices 450 (e.g., optical storage, magnetic storage, hard drive, tape drive, solid state memory, etc) and one or more memories 410 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 4 (e.g., video cards, audio cards, additional network interfaces, peripheral devices, a network interface such as an ATM interface, an Ethernet interface, a Frame Relay interface, etc.)

In this example, the one or more processors 470, the storage device(s) 450, and the system memory 410 are coupled to the system interconnect 440. One or more of the system memories 410 may contain program instructions 420. Program instructions 420 may be executable to implement one or more applications 422, shared libraries 424, operating systems 426, or contention managers 428, as described herein. Program instructions 420 may be encoded in platform native binary, any interpreted language such as Java™ byte-code, or in any other language such as C/C++, Java™, etc or in any combination thereof The program instructions 420 may include transactional memory support configured to provide functions, operations and/or other processes for implementing gang release, including gang determination, and memory contention management as described herein. Such support and functions may exist in one or more of the shared libraries 424, operating systems 426, contention managers 428, or applications 422. The system memory 410 may further comprise private memory locations 430 and/or shared memory locations 435, where data used in implementing the methods described herein, along with other data, may be stored. For example, this data may include data used in gang release decisions such as global execution data, performance data, execution history data, and/or data reflecting abort relationships.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A computer-implemented method, comprising:
    detecting that execution of a plurality of threads is blocked due to the plurality of threads waiting to acquire a given lock in a multi-threaded, transactional memory system, wherein each of the plurality of threads includes a respective section that is dependent on the given lock;
    in response to said detecting:
        determining a subset of the plurality of threads for which to attempt execution of their respective sections as speculative transactions, wherein the subset comprises two or more of the plurality of threads; and
        releasing the subset of threads from a waiting pool associated with the given lock; and
    subsequent to said releasing, attempting to execute the respective section of at least one of the threads in the subset transactionally without acquiring the given lock.

2. The method of claim 1, wherein the subset comprises all of the plurality of threads.

3. The method of claim 1, wherein said determining a subset is dependent, at least in part, on one or more of:
    a number of threads waiting on the given lock;
    a number of previous unsuccessful attempts to execute one of the plurality of threads transactionally;
    a historical abort relationship between two or more of the plurality of threads; or
    program instructions to be executed by the plurality of threads.

4. The method of claim 1, further comprising:
    subsequent to said releasing, introducing an other thread of the plurality of threads into the subset; and
    the other thread attempting to execute transactionally without acquiring the given lock.

5. The method of claim 4, wherein said introducing is performed in response to one or more threads in the subset completing an attempt to execute transactionally.

6. The method of claim 1, further comprising:
    subsequent to said releasing, one of the plurality of threads that is not included in the subset acquiring the lock.

7. The method of claim 6, wherein said acquiring is performed in response to one or more threads in the subset completing an attempt to execute transactionally.

8. A system comprising:
    one or more processors; and
    a memory coupled to the one or more processors and storing program instructions executable by one or more processors to implement:
        detecting that execution of a plurality of threads is blocked due to the plurality of threads waiting to acquire a given lock in a multi-threaded, transactional memory system, wherein each of the plurality of threads includes a respective section that is dependent on the given lock;
        in response to said detecting:
            determining a subset of the plurality of threads for which to attempt execution of their respective sections as speculative transactions, wherein the subset comprises two or more of the plurality of threads; and
            releasing the subset of threads from a waiting pool associated with the given lock; and
        subsequent to said releasing, attempting to execute the respective section of at least one of the threads in the subset transactionally without acquiring the given lock.

9. The system of claim 8, wherein the subset comprises all of the plurality of threads.

10. The system of claim 8, wherein said determining a subset is dependent, at least in part, on one or more of:
    a number of threads waiting on the given lock;
    a number of previous unsuccessful attempts to execute one of the plurality of threads transactionally;
    a historical abort relationship between two or more of the plurality of threads or program instructions to be executed by the plurality of threads.

11. The system of claim 8, wherein the program instructions are further executable to implement:
    subsequent to said releasing, introducing an other thread of the plurality of threads into the subset; and
    the other thread attempting to execute transactionally without acquiring the given lock.

12. The system of claim 11, wherein said introducing is performed in response to one or more threads in the subset completing an attempt to execute transactionally.

13. The system of claim 8, wherein the program instructions are further executable to implement:
    subsequent to said releasing, one of the plurality of threads that is not included in the subset acquiring the lock.

14. The system of claim 13, wherein said acquiring is performed in response to one or more threads in the subset completing an attempt to execute transactionally.

15. A computer readable storage medium storing program instructions computer-executable to implement:
    detecting that execution of a plurality of threads is blocked due to the plurality of threads waiting to acquire a given lock in a multi-threaded, transactional memory system, wherein each of the plurality of threads includes a respective section that is dependent on the given lock;
    in response to said detecting:
        determining a subset of the plurality of threads for which to attempt execution of their respective sections as speculative transactions, wherein the subset comprises two or more of the plurality of threads; and
        releasing the subset of threads from a waiting pool associated with the given lock; and
    subsequent to said releasing, attempting to execute the respective section of at least one of the threads in the subset transactionally without acquiring the given lock.

16. The storage medium of claim 15, wherein the subset comprises all of the plurality of threads.

17. The storage medium of claim 15, wherein said determining a subset is dependent, at least in part, on one or more of:
    a number of threads waiting on the given lock;
    a number of previous unsuccessful attempts to execute one of the plurality of threads transactionally;
    a historical abort relationship between two or more of the plurality of threads or program instructions to be executed by the plurality of threads.

18. The storage medium of claim 15, wherein the program instructions are further executable to implement:
    subsequent to said releasing, introducing an other thread of the plurality of threads into the subset; and
    the other thread attempting to execute transactionally without acquiring the given lock.

19. The storage medium of claim 18, wherein said introducing is performed in response to one or more threads in the subset completing an attempt to execute transactionally.

20. The storage medium of claim 15, wherein the program instructions are further executable to implement:
   subsequent to said releasing, one of the plurality of threads that is not included in the subset acquiring the lock.

* * * * *

UNITED STATES PATENT AND TRADEMARK OFFICE
CERTIFICATE OF CORRECTION

| | | |
|---|---|---|
| PATENT NO. | : 8,789,057 B2 | Page 1 of 1 |
| APPLICATION NO. | : 12/327659 | |
| DATED | : July 22, 2014 | |
| INVENTOR(S) | : Dice et al. | |

It is certified that error appears in the above-identified patent and that said Letters Patent is hereby corrected as shown below:

On title page 2, column 2, under Other Publications, line 20, delete "Univerity" and insert -- University --, therefor.

Signed and Sealed this
Twenty-fourth Day of February, 2015

Michelle K. Lee
*Deputy Director of the United States Patent and Trademark Office*